United States Patent
Lutter et al.

(10) Patent No.: US 6,768,282 B2
(45) Date of Patent: Jul. 27, 2004

(54) METHOD FOR DETECTING THE ROTATIONAL POSITION OF THE DRIVE SHAFT A DC MOTOR

(75) Inventors: Thomas Lutter, Hoeingen (DE); Thomas Friedrich, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 16 days.

(21) Appl. No.: 10/182,059

(22) PCT Filed: Jun. 1, 2001

(86) PCT No.: PCT/EP01/06215

§ 371 (c)(1),
(2), (4) Date: Dec. 31, 2002

(87) PCT Pub. No.: WO01/95471

PCT Pub. Date: Dec. 13, 2001

(65) Prior Publication Data

US 2003/0122515 A1 Jul. 3, 2003

(30) Foreign Application Priority Data

Jun. 6, 2000 (DE) .......................................... 100 28 036
Jun. 6, 2000 (DE) .......................................... 100 28 039

(51) Int. Cl.⁷ ................................................. G01P 3/48
(52) U.S. Cl. ........................ 318/603; 318/286; 318/652; 318/632
(58) Field of Search ................................ 318/600, 601, 318/603, 632, 652, 244, 245, 286, 466, 266

(56) References Cited

U.S. PATENT DOCUMENTS

| | | | |
|---|---|---|---|
| 4,514,670 A * | 4/1985 | Fassel et al. ................ 318/467 |
| 4,924,166 A * | 5/1990 | Roussel ....................... 318/608 |
| 5,432,421 A | 7/1995 | Kessler et al. |
| 6,144,179 A | 11/2000 | Kessler et al. |
| 6,326,757 B1 * | 12/2001 | Aoki et al. .................. 318/599 |
| 6,437,533 B1 * | 8/2002 | Du et al. ..................... 318/560 |
| 6,456,028 B2 * | 9/2002 | Aoki et al. .................. 318/470 |
| 6,559,616 B2 * | 5/2003 | Aoki et al. .................. 318/567 |
| 6,628,893 B2 * | 9/2003 | Ohno et al. .................. 388/800 |

FOREIGN PATENT DOCUMENTS

| | | |
|---|---|---|
| DE | 197 29 238 C1 | 7/1997 |
| DE | 198 55 996 C1 | 10/1998 |
| EP | 0 689 054 A1 | 5/1995 |

\* cited by examiner

Primary Examiner—Bentsu Ro
(74) Attorney, Agent, or Firm—Brooks Kushman P.C.

(57) ABSTRACT

A method for determining the rotational position of the drive shaft of a DC motor includes providing a period of a reference current ripple indicative of proper operation of the motor. The period of the reference current ripple is then compared with the period of each current ripple contained in a rotor current signal of the motor during operation of the motor. The current ripples of the rotor current signal of the motor having periods which differ from the period of the reference current ripple are then corrected. A corrected rotor current signal based on the corrected current ripples and uncorrected current ripples of the rotor current signal of the motor is then generated. The current ripples contained in the corrected rotor current signal are then counted to determine the position of the drive shaft of the motor and, consequently, the position of an element being driven by the motor.

14 Claims, 2 Drawing Sheets

METHOD FOR DETECTING THE ROTATIONAL POSITION OF THE DRIVE SHAFT A DC MOTOR

FIELD OF THE INVENTION

The invention pertains to a method for determining the rotational position of the drive shaft of a direct current (DC) motor and especially determining the position of an element driven by the drive shaft within a predetermined path of movement by evaluating the current ripples contained in the rotor current signal.

BACKGROUND ART

The rotor current signal of a DC motor is made up of a DC component and an AC (analog current) component superimposed on the DC component. The AC component results from the interaction of the magnet (field), the rotor windings, and the commutator of the DC motor during operation of the DC motor. This manifests itself through transient changes in the induced voltage which produce ripples in the rotor current signal. When the rotor is rotating the current spikes, called "current ripples" and "current peaks" in the following description, in the rotor current signal occur at a frequency corresponding to the number of collector plates. If the rotor has, e.g., 10 collector plates, then 10 current ripples are detected in the rotor current signal. Thus, counting the current ripples provides information on the current rotational position of the rotor of the DC motor and thus, provides information relative to the position of the driven element within its predetermined path of movement. For this purpose, the analog rotor current signal is digitized in order to count the current ripples.

Such a method is known, e.g., from DE 195 11 307 C1. So that interference pulses superimposed on the rotor current signal are not included in the evaluation of the current ripple count, typically the analog rotor current signal undergoes conditioning before its digitization, e.g., it is subjected to frequency filtering. These previously known means and also other means are used so that a current ripple signal that is as free from interference pulses as much as possible can be supplied for digitization and subsequent count evaluation. In this context, interference pulses do not include pulses that are conditional to the commutator and that are superimposed on the rotor current signal.

However, during operation of a DC motor, particularly under a load, the current ripple contained in the rotor current signal can become distorted. Such a distortion can be evident by two current peaks. In the course of digitizing such a rotor current signal, instead of one current peak, two current ripples are indicated at the position of the distortion in the current ripple signal. Counting this double ripple leads to erroneous position determination of the driven element. Corresponding results apply for the absence or non-detection of a current ripple. These errors are conditional to the commutator and thus they can be eliminated without anything further through conditioning of the analog rotor current signal.

Such methods are used, e.g., in the automotive field, for controlling an adjustable drive, like those provided, e.g., for windows and sunroofs. An essential element in the determination of the position, e.g., of the window, is the element that can turn off the jamming protection when the window is being closed. Turning off this protection is necessary so that the window can travel completely into its upper block and into the seals arranged in this block without the increased load forcing the motor to be turned off. With erroneous counting of the current ripples for determining the position of the window the jamming protection may be turned off too early or too late.

SUMMARY OF THE INVENTION

Starting with the state of the art that has been discussed, the objective of the invention is based on refining a method according to the class mentioned above such that an exact current ripple count is guaranteed even when a current ripple contained in the rotor current signal is distorted or absent.

For the object of the invention, a correct, undistorted current ripple used as a calibration or reference variable is compared with other, possibly faulty current ripples. This alignment between a correctly defined current ripple and the other ripples is done by comparing each period with the others. For the reference current ripple, it is assumed that its period corresponds with sufficient precision to the detected period of the current ripple in the rotor current signal of the DC motor or from the period determined from this signal. A comparison of the periods of the reference current ripple with the period of each, actually measured current ripple in the current ripple signal leads to the correction of periods in the current ripple signal which do not exhibit sufficient agreement with the period of the reference current ripple.

For providing a reference current ripple, in one embodiment, the DC motor operates in connection with a desired movement of the driven element from a first position into a second position for a short time period without a load and the rotor current signal from this operating state of the DC motor is evaluated with reference to current ripples contained in the signal. This configuration of the invention assumes that erroneous current ripples which can be distorted or even missing occur at a higher frequency when the DC motor operates under a load and erroneous ripples do not occur or only occur at a negligible frequency when the DC motor operates without a load. Thus, the periods of the current ripple when the DC motor operates without a load can be used as reference current ripples.

The object of the invention uses the premise that a rapid change in the rotational speed of the DC motor, for instance a doubling or a halving resulting in a corresponding halved or doubled period as compared with the period of the reference current ripple, is not possible due to the moment of inertia of the moving parts of the DC motor. Conditional to the commutator, erroneous or distorted current ripples exhibit two maximums instead of one expected maximum in the analog rotor current signal. For instance, the detection of a rapid halving of the period for a current ripple relative to the period of the reference current ripple or also relative to the period of a previous current ripple allows the conclusion to be made that this period halving is not a result, for instance, of a rapid doubling of the rotational speed of the DC motor, but instead, it is a result of a distorted current ripple. The number of current-ripple periods recognized as erroneous in the current ripple signal is then corrected correspondingly.

The period of the reference current ripple can be determined advantageously from the rpm (revolutions per minute) or speed of the rotor of the DC motor. The rpm or speed of the rotor of the DC motor is determined from the present current and voltage values applied to the DC motor. Because erroneous periods can be noticed either through doubling or halving of the period of the reference current ripple, the factors that influence the actual rpm or speed of the rotor of the DC motor in addition to the current or voltage values, e.g., the motor inductivity or temperature influences, can be basically ignored. These factors can be ignored because the variables associated with these factors do not change enough to call attention to the fact that the period of the reference current ripple calculated from the detected rpm or speed is off by a factor of two.

However, it is advantageous for the period of the reference current ripple to have a tolerance range that is much smaller than the determined period of the reference current ripple. The period of the reference current ripple, with or without a tolerance range, can be adapted further depending on the actually measured period of the individual current ripples, so that in this way, other factors influencing the rpm and speed of the rotor are also considered in processing the period of the reference current ripple. This provides a self-teaching and somewhat self-calibrating system.

By comparing the period of a reference current ripple with each period of the current ripples contained in the current ripple signal, a correction is performed for each period recognized as erroneous without averaging a period over a certain amount of time. Therefore, for the method of the invention, the current ripple signal is corrected in its smallest unit, namely the period of each current ripple. This has the result that the rotational position of the drive shaft of the DC motor can be determined in a cycle corresponding to the period of the reference current ripple.

The number of current-ripple periods recognized as defective in the current ripple signal is corrected when a distorted current ripple occurs. For instance, two current ripples are contained in the current ripple signal instead of only one, if the detected period is halved relative to the period of the reference current ripple; a corresponding correction is performed that divides the number of detected current ripples with halved periods by a factor of two.

A corresponding process is performed for the inverse case when the period reproduced in the current ripple signal is, e.g., doubled by an apparent fusion of two current ripples. To correct this error, the number of such periods is doubled.

Therefore, with the method according to the invention, an exact position determination of the element driven by the DC motor is performed even when faulty current ripples are contained in the current ripple signal due to certain load conditions.

Fundamentally, a correction as described above can be performed at an arbitrary time within each period, in which the DC motor is operated for moving the driven element from a first position into a second position. In the scope of the previously described embodiment, in which a reference current ripple is provided by motor operation without a load, all that must be guaranteed for determining the reference current ripple is that the motor operates for a period of time without or essentially without a load before performing the adjustment movement for the driven element. This can be the case, e.g., at the motor start-up phase or also at the motor stop-down phase. Such an operating state, where the DC motor driving the driven element operates without a load, can be realized through a correspondingly conceived mechanical power transmission means from the DC motor to the driven element, for instance, a cable line. This can provide sufficient play in the power transmission between the driving of DC motor and the driven element in order to have a sufficient rotational movement of the DC motor without a load so that at least one reference current ripple can be detected.

The method according to the invention is suitable particularly for use in the scope of position detection for an adjustment device for opening and closing a window, a sunroof, or for adjusting a seat in a motor vehicle. Position determination, e.g., of the window, can then be performed just by evaluating the current ripple signal without the use of additional sensors. However, with such a use, the reference current ripple must be detected at the motor start and thus before movement of the window, such that simultaneous with the movement, the desired correction can be performed without having to store the entire current ripple signal at the beginning and without having to correct the performed movement relative to the position determination of the driven element at the end. Only in this way can the corresponding position of the window be detected with sufficient reliability to indicate whether the jamming protection can be turned off depending on other factors so that the window can be moved into the seals of the upper block.

DETAILED DESCRIPTION

Figure 1:
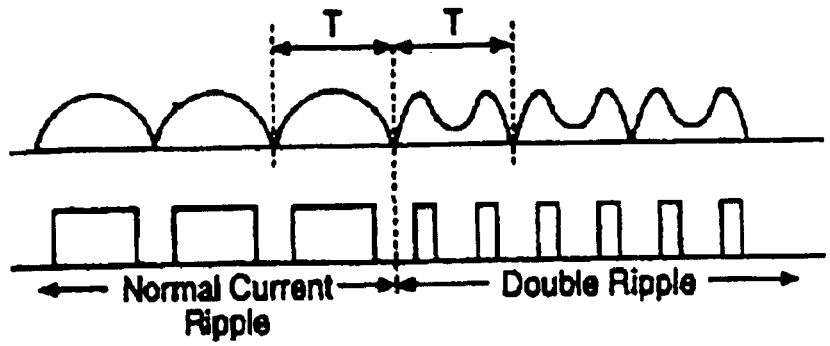
FIG. 1 illustrates an analog rotor current signal having current ripples and a digitized current ripple signal derived from the analog rotor current signal.

Sketched in FIG. 1 is a diagram with an analog rotor current signal and current ripples contained in the signal, as well as the digitized current ripple signal derived according to a known method. In FIG. 1, the first section on the left shows non-faulty current ripples which can serve as reference current ripples. In the adjacent section to the right, the analog rotor current curve exhibits distorted current ripples. The distorted current ripples are reproduced in the digitized current ripple signal as so-called double ripples.

Figure 2:
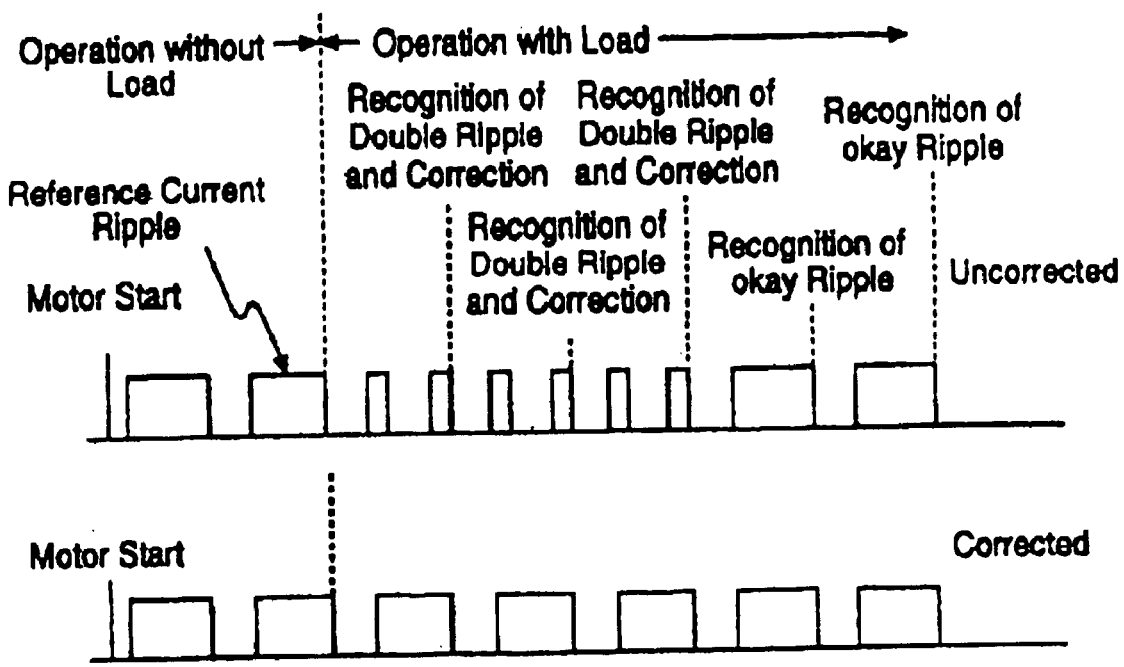
FIG. 2 illustrates a sketch of the course of the digitized current ripple curve before and after correction is performed in accordance with the method of the invention.

FIG. 2 shows a sketch of the course of the digitized current ripple curve before and after correction is performed according to the invention. The lower curve, designated as "corrected", represents a reconstruction of the corrected current ripple signal. The correction actually only performs a pulse count such that the curve designated as corrected is the end result of the correction method. FIG. 2 clearly shows that without correction, counting the current ripples indicates that the element driven by the DC motor has moved through a position change corresponding to the rotational angle value of ten collector plates. However, the driven element has actually only been moved by a rotational angle value corresponding to seven collector plates.

A plausibility check for the correction to be performed can be done by comparing the period of one or more current ripples following the current ripple recognized as faulty. For this plausibility check, the assumption is used that distorted or missing current ripples in the rotor current curve usually occur only for one collector plate and do not continue over several subsequent collector plates. However, with the object of the invention, it is fundamentally possible to perform such a plausibility check for a certain number of periods.

Figure 3:
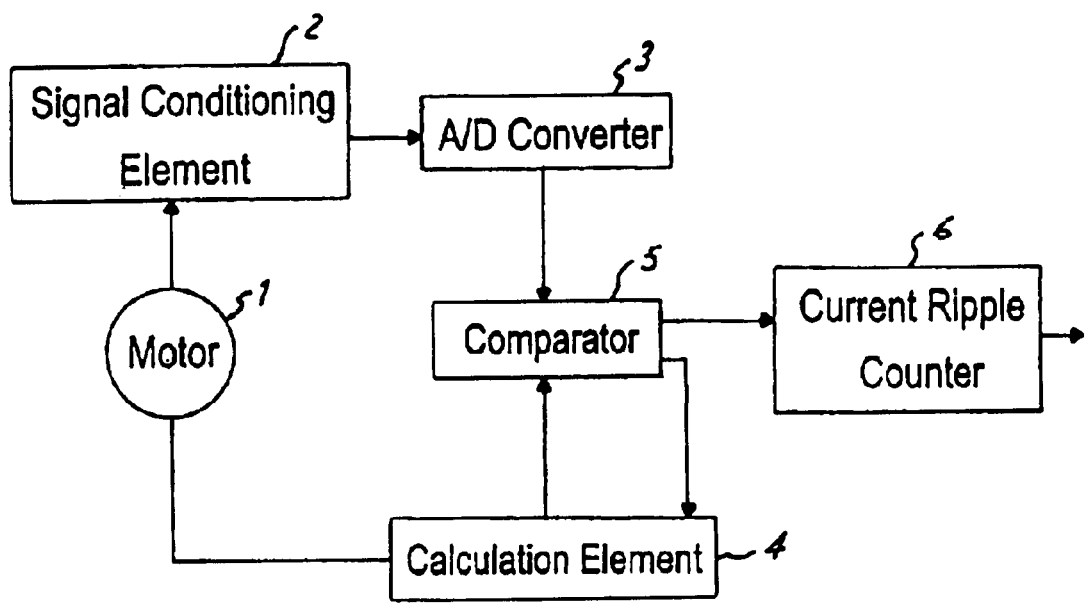
FIG. 3 illustrates a block diagram of an arrangement for carrying out the method of the invention.

For additional explanation of the invention, the embodiment shown in FIG. 3 is referenced. FIG. 3 shows a block circuit diagram of an arrangement for performing the method of the invention. The analog rotor current signal of a DC motor 1 is detected to determine the rotational position of the rotor of the DC motor. A signal conditioning element 2 conditions the analog rotor current signal to eliminate possible noise pulses. There can be different and also multiple signal processing steps, e.g., a low-pass filter, to condition the rotor current signal. The prepared rotor current signal is applied to an A/D converter 3 for digitizing the analog rotor current signal.

The present current and voltage values are simultaneously applied to the input of a calculation element 4. Calculation element 4 is used to provide the period of a reference current ripple. Calculation element 4 determines the period from the current and voltage values applied to the inputs of the calculation element and the resulting rpm. In addition, calculated periods are given a predetermined tolerance region that is much smaller than the calculated period.

A comparator 5 receives at its inputs both the output signal of A/D converter 3 and also the reference period determined by calculation element 4. Comparator 5 performs a comparison between the period of the reference current ripple and the period derived from the rotor current signal relative to a current ripple. For sufficient agreement of both periods, the actually measured period is fed to a current ripple counter 6. For insufficient agreement of the two periods being compared, a correction of the actually measured period is performed with reference to the period made available by calculation element 4 as a reference variable before this subsequently corrected period is fed to current ripple counter 6. The output of current ripple counter 6 is connected to the input of an evaluation element (not shown in more detail) for determining the rotational position of the rotor of DC motor 1.

The signal at the output of comparator 5 is further connected to another input of calculation element 4, such that in the calculation and conditioning of the reference current ripple, the periods, if necessary corrected, of the preceding ripples can also be considered. In this way, the system illustrated in FIG. 3 is self-learning and can adapt to changing influences. In particular, for this alignment of the actual periods, the tolerance region of the reference periods can be made very small.

For the embodiment illustrated in FIG. 3, the individual elements are illustrated as devices. However, the block circuit diagram illustrated in FIG. 3 can also be read as a flow chart, which makes it clear that the individual processing steps can also be realized in software.

| Summary of reference numbers |
|---|
| 1 Motor |
| 2 Signal conditioning element |
| 3 A/D converter |
| 4 Calculation element |
| 5 Comparator |
| 6 Current ripple counter |

What is claimed is:

1. A method for determining the rotational position of the drive shaft of a DC motor, the method comprising:

providing a period of a reference current ripple indicative of proper operation of the DC motor;

comparing the period of the reference current ripple with the period of each current ripple contained in a rotor current signal of the DC motor during operation of the DC motor;

correcting the current ripples of the rotor current signal of the DC motor having periods which differ from the period of the reference current ripple;

generating a corrected rotor current signal based on the corrected current ripples and uncorrected current ripples of the rotor current signal of the DC motor; and counting the current ripples contained in the corrected rotor current signal to determine the position of the drive shaft of the DC motor.

2. The method of claim 1 wherein:

the period of the reference current ripple is determined from the rotor speed of the DC motor during operation of the DC motor.

3. The method of claim 2 wherein:

the rotor speed of the DC motor is determined from current and voltage values applied to the DC motor during operation of the DC motor.

4. The method of claim 2 wherein:

the period of the reference current ripple includes a tolerance region that is smaller than the period of the reference current ripple.

5. The method of claim 4 wherein:

the tolerance region is adapted as a function of a corrected current ripple of the rotor current signal of the DC motor.

6. A method for determining the position of an element driven by the drive shaft of a DC motor along a predetermined path of movement, the method comprising:

detecting an error-free reference current ripple of a rotor current signal of the DC motor during operation of the DC motor prior to driving the element;

determining the period of the reference current ripple;

comparing the period of the reference current ripple with the period of each current ripple detected in the rotor current signal of the DC motor while the DC motor is driving the element along the predetermined path of movement;

correcting the current ripples of the rotor current signal of the DC motor having periods which differ from the period of the reference current ripple;

generating a corrected rotor current signal based on the corrected current ripples and uncorrected current ripples of the rotor current signal of the DC motor; and counting the current ripples contained in the corrected rotor current signal to determine the position of the element along the predetermined path of movement.

7. The method of claim 6 wherein:

detecting an error-free reference current ripple includes operating the DC motor without a load for a predetermined time period before the DC motor drives the element along the predetermined path of movement.

8. The method of claim 7 wherein:

the DC motor is operated for the predetermined time period without a load during start-up operation.

9. The method of claim 6 further comprising:

performing a plausibility check of the correction of a current ripple of the rotor current signal by using the periods of the current ripples of the rotor current signal following the corrected current ripple.

10. The method of claim 6 wherein:

the driven element is a motor vehicle driven element.

11. The method of claim 10 wherein:

the driven element is a window.

12. The method of claim 10 wherein:

the driven element is a sunroof.

13. The method of claim 10 wherein:

the driven element is a seat.

14. A device for determining the rotational position of the drive shaft of a DC motor using an analog rotor current signal of the DC motor, the device comprising:

an analog-to-digital converter element for digitizing the analog rotor current signal;

a calculation element for determining a period of a reference current ripple indicative of proper operation of the DC motor based on the value of electrical power applied to the DC motor during operation;

a comparator for comparing the period of the reference current ripple with the period of each current ripple contained in the digitized rotor current signal, the comparator correcting the current ripples contained in the digitized rotor current signal having periods which differ from the period of the reference current ripple; and a current ripple counter for counting the current ripples contained in the corrected digitized analog rotor current signal.

* * * * *